United States Patent [19]

Brix

[11] 3,937,304

[45] Feb. 10, 1976

[54] DISC BRAKE CALIPERS

[75] Inventor: Hermann Brix, Koblenz, Germany

[73] Assignee: Girling Limited, Birmingham, England

[22] Filed: Aug. 16, 1974

[21] Appl. No.: 498,179

Related U.S. Application Data

[62] Division of Ser. No. 348,472, April 6, 1973, abandoned.

[30] Foreign Application Priority Data

Apr. 11, 1972 United Kingdom............ 16715/72

[52] U.S. Cl.............................. 188/73.5; 188/72.5
[51] Int. Cl.²................. F16D 55/228; F16D 65/00
[58] Field of Search .... 188/73.3, 72.5, 73.5, 205 A, 188/250 B, 73.6

[56] References Cited
UNITED STATES PATENTS

| | | | |
|---|---|---|---|
| 3,298,469 | 1/1967 | Robinette | 188/73.5 X |
| 3,517,777 | 6/1970 | Beller | 188/250 B X |
| 3,625,316 | 12/1971 | Mori | 188/73.5 |

FOREIGN PATENTS OR APPLICATIONS

| | | | |
|---|---|---|---|
| 890,647 | 3/1962 | United Kingdom | 188/73.3 |
| 1,655,298 | 1/1971 | Germany | 188/72.5 |
| 1,927,459 | 5/1970 | Germany | 188/73.5 |

*Primary Examiner*—George E. A. Halvosa
*Attorney, Agent, or Firm*—Scrivener Parker Scrivener and Clarke

[57] ABSTRACT

The present specification discloses and claims an opposed piston disc brake caliper of the fixed type together with a pad anti-rattle spring for use therewith. The caliper is formed in two halves, each half having a machined surface in which a pad recess is formed. The caliper halves when clamped together with the machined surfaces engaging each other, leave part of a machined surface exposed at least at one side of a friction pad locating aperture formed by the two pad recesses. This exposed part of the machined surface acts as a datum surface against which part of the pads anti-rattle spring can engage. The pad anti-rattle spring has a generally rectangular configuration and is dimensioned to fit into the pad locating aperture. At least one window is cut in the spring to allow for inspection of pad wear, and a lateral tag is provided on the spring in the region of the or each datum surface. The tag or tags can be engaged with the datum surface on the caliper to correctly locate the spring and allow accurate inspection of the pads through the at least one window.

8 Claims, 10 Drawing Figures

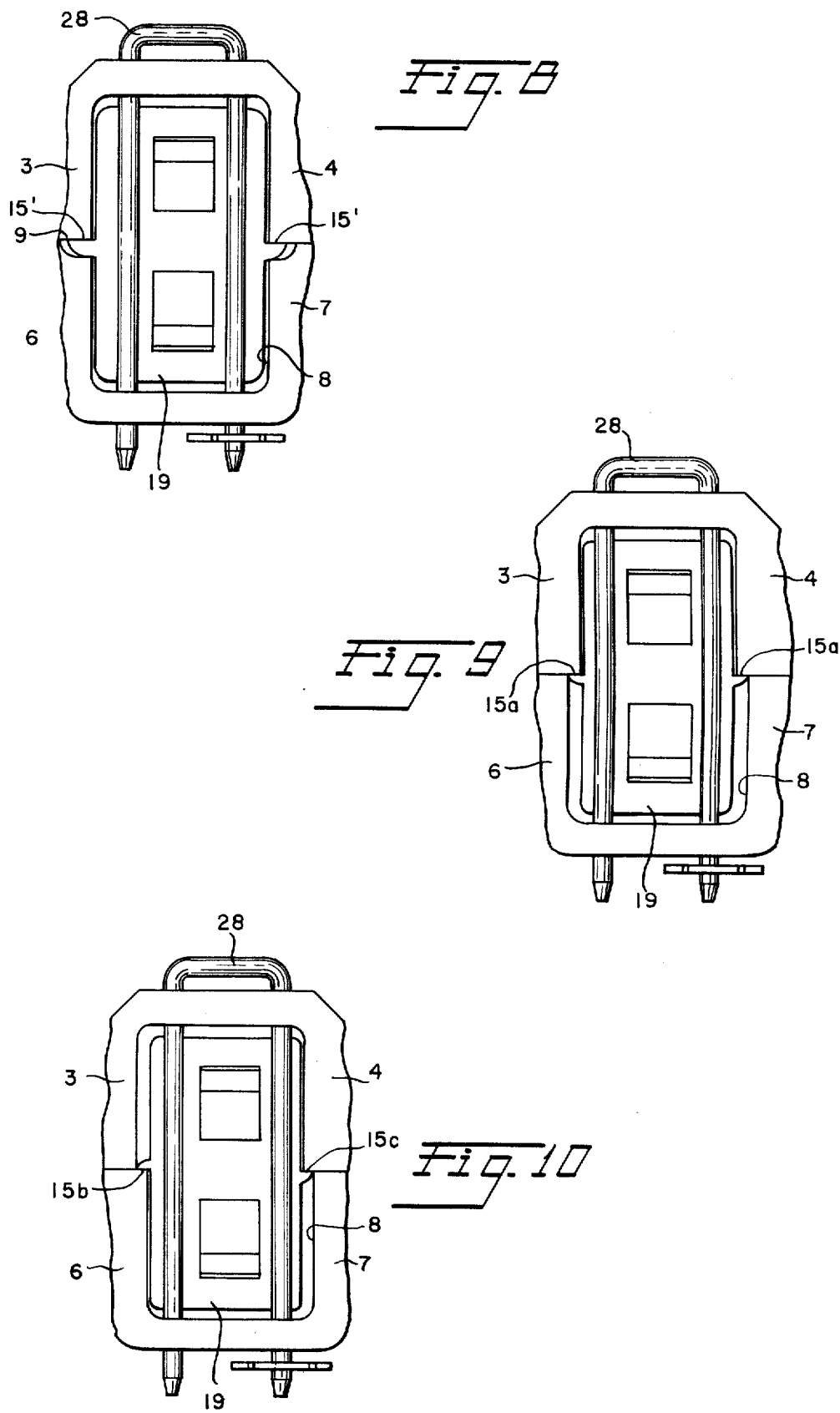

DISC BRAKE CALIPERS

This is a division of application Ser. No. 348,472 filed Apr. 6, 1973, now abandoned.

The present invention relates to disc brake calipers and more particularly to disc brake calipers of the opposed piston type, the caliper being in a fixed position during operation of the brake.

A disc brake caliper of the opposed piston type, which is fixed in position during operation of the brake, is formed in two halves which are bolted together, the caliper in plan view, appearing to be constructed from two U-shaped sections. Each U-shaped section forming a half of the caliper, has what is termed hereinafter a "pad recess", between the arms thereof. The completed caliper is formed by bolting the two U-shaped sections together, the pad recess in each section forming what is termed hereinafter, a "pad locating aperture" in the caliper. Brake pads fit in this pad locating aperture and at various intervals during the life of the brake pads, it is necessary to inspect the pads to check the degree of wear, this being possible by merely inspecting the pads through the pad locating aperture in the caliper. It is also desirable that the disc brakes should not be a source of noise; one of the most common noises associated with such brakes being the rattling of the pads within their guides in the caliper. A common solution to this problem is the provision of an anti-rattle spring which acts to resiliently hold the pads in engagement with pad guide surfaces. A known pad anti-rattle spring is of plate construction. However, when such a spring is installed in a caliper within the pad locating aperture, it prevents the aforementioned inspection of the pads. This problem has been overcome by forming windows in the plate-like anti-rattle spring.

However, with this construction of spring unless it is located against a datum face it is possible to obtain an incorrect reading of the degree of wear on each pad, i.e. one pad could appear to be fully worn whilst the other would appear to have sufficient material thickness. Such a datum face against which the anti-rattle spring must be engaged to give a correct reading of the wear to a pad, could readily be provided by either or both of the opposed end faces of the pad locating aperture in the caliper i.e. the base faces of the pad recesses in each of the halves of the caliper. This is quite possible; however, to meet the requirements of positively positioning the spring, the end face or faces, which are normally left in an "as cast condition" must be machined to provide a true datum surface. Obviously, this machining increases the cost of the brake. The present invention provides the necessary datum surface or surfaces without the added expense of further machining these said end walls.

According to the present invention there is provided an opposed piston disc brake caliper of the fixed type, the caliper being formed in two halves, each half of the caliper having a machined surface in which is located a pad recess, the halves of the caliper in a completed brake being held together so that said machined surfaces engage each other, the recesses then together forming a pad locating aperture and part of one of said machined surfaces being exposed at least at one side of the pad locating aperture.

In a preferred embodiment of the present invention the machined surface of each half of a caliper is cut away at one side of said pad recess. Thus, when the two halves which have pad recesses of equivalent dimensions, are joined together, the cutaway portion of the machined surface contiguous to the pad recess of each caliper half, exposes part of the machined surface on the contiguous other half of the caliper. These exposed machined surfaces provide the necessary datum surfaces for projections on a pad anti-rattle spring. By machining each caliper half in exactly the same location i.e. cutting away the machined surface at the same side of the pad recess on each caliper half, production costs may be reduced as this allows the caliper halves to be non-handed, the same jigs and tool settings being possibly suitable for working both caliper halves of a disc brake.

Alternatively, one half of a caliper may be cut away at both sides of the pad recess contiguous to the machined surface thereof. Further, by utilising two caliper halves having different width pad recesses i.e. when seen in plan view, the necessary datum surfaces will be exposed when the two halves are bolted together. Also, where suitable, by utilising caliper halves with equivalent dimensioned pad recesses, the necessary datum surfaces may be provided by bolting the two halves together so that the pad recesses are off-set relative to each other i.e. when seen in plan view.

According to a further feature of the present invention there is provided a pad anti-rattle spring for use in an opposed piston disc brake caliper of the fixed type, the spring being of substantially rectangular configuration, a window aperture being provided in said spring and at least one side of the spring being provided with a tag.

The spring is dimensioned to fit in the pad locating aperture in the caliper and the tag or tags arranged to engage against an exposed machined surface of the caliper.

One embodiment of pad anti-rattle spring suitable for use with the preferred embodiment of the present invention, is of generally rectangular configuration and comprises a central generally rectangular section having at least one window aperture therein, elongate spring members being integrally attached in their middle regions one to the middle region of each of two opposed sides of said central section, said elongate spring members each having an integral tag projecting from an outer edge thereof, said tags extending generally in opposite directions.

In a preferred embodiment of pad anti-rattle spring, there are provided two window apertures in the central generally rectangular section of the spring. The window apertures and tags are so arranged relative to each other that when the tags engage against a machined datum surface on the caliper, a correct reading of the degree of wear to the pads can be obtained by inspection through said window apertures.

The window apertures' dimensions are preferably chosen so that they expose a small area of the pads only. The area of the window apertures being small relative to the total area of the whole spring so that the spring provides an effective dust shield for all working parts of the caliper.

The present invention will now be further described by way of example, with reference to the accompanying drawings, in which:

FIG. 1 is a plan view of a preferred embodiment of a caliper constructed in accordance with the invention, with a pad anti-rattle spring fixed in position, FIG. 2 is a sectional view along line A—A in FIG. 1, FIG. 3 is an end view with a partial section taken along line B—B in FIG. 1, FIG. 4 is an enlarged plan view of the pad anti-rattle spring illustrated in FIG. 1, FIG. 5 is a sectional view of the spring illustrated in FIG. 4 taken along line V—V, FIG. 6 is an end elevation of the pad anti-rattle spring illustrated in FIG. 4, and FIG. 7 is a sectional view of the pad anti-rattle spring in FIG. 4 taken along line VII—VII.

FIG. 8 is a broken plan view similar to FIG. 1 showing an alternate arrangement;

FIG. 9 is a broken plan view similar to FIG. 8 showing yet another arrangement; and FIG. 10 is a broken plan view similar to FIGS. 8 and 9 showing still another alternate arrangement.

Figure 1:
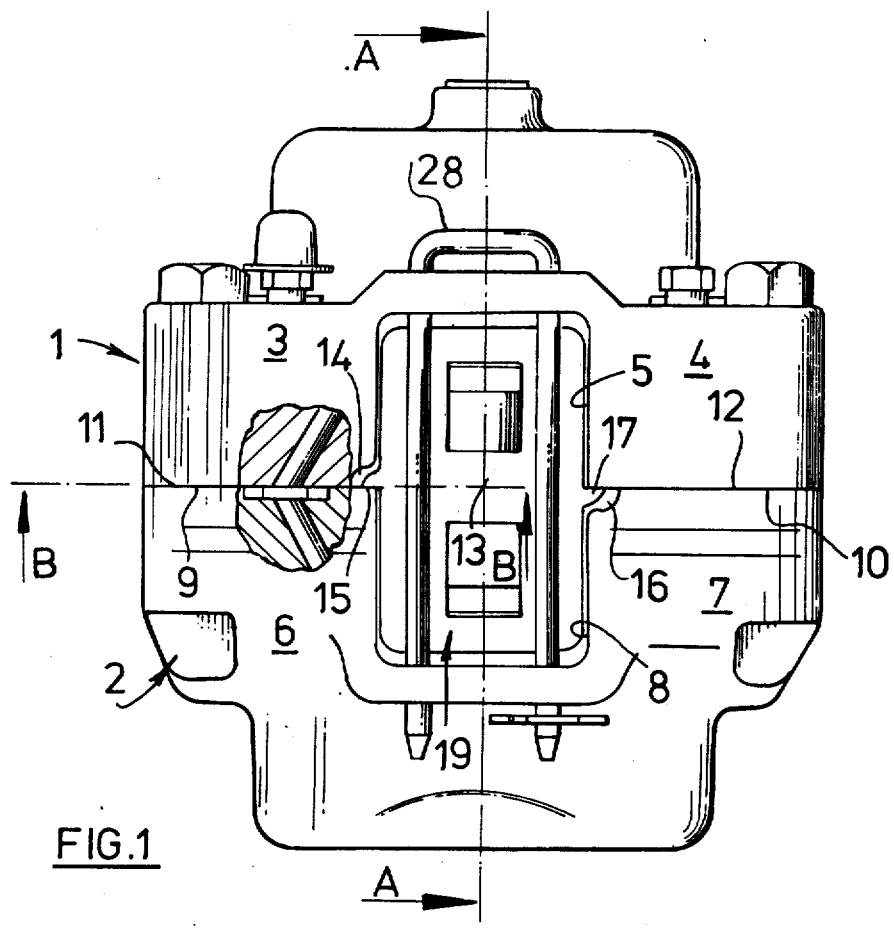
Figure 2:
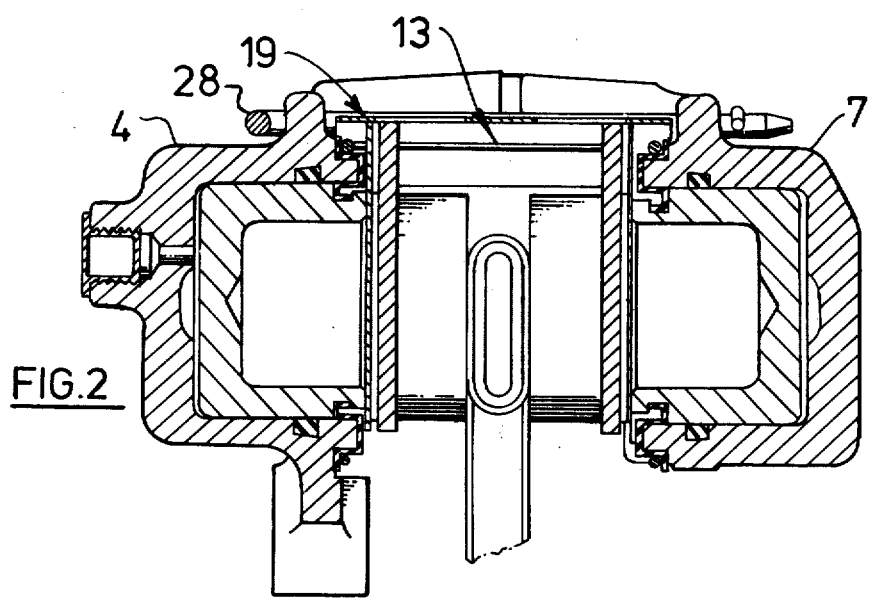
Figure 3:
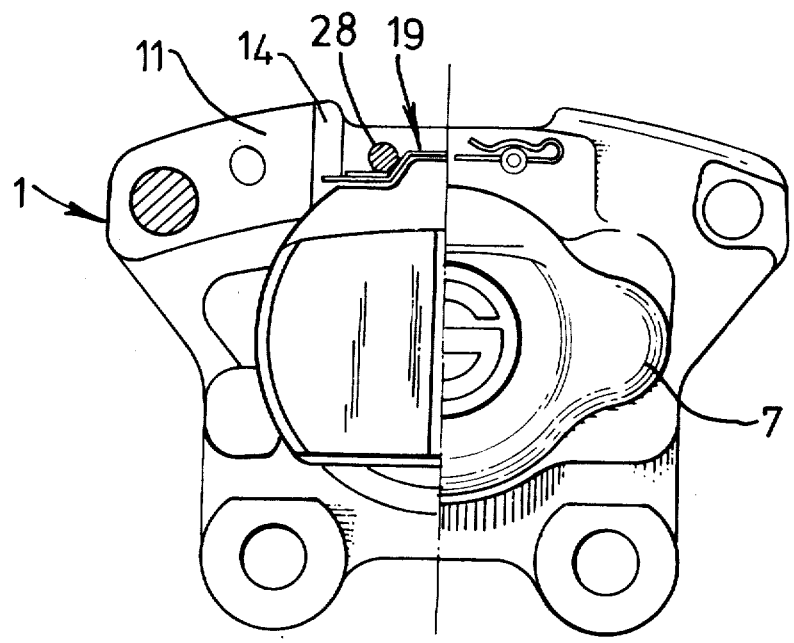

In FIGS. 1 to 3 of the accompanying drawings, various views of a preferred embodiment of a caliper constructed in accordance with the present invention, are illustrated. The caliper has two halves 1 and 2 each half when viewed in plan, i.e. as in FIG. 1, appearing to have a generally U-shaped configuration. Caliper half 1 has two arms or sections 3 and 4 between which there is located a pad recess 5. Caliper half 2 has two arms or sections 6 and 7 between which is located a pad recess 8. The halves 1 and 2 of the caliper are bolted together forming the disc brake, surfaces 9 and 10 of sections 6 and 7 respectively, mating respectively with surfaces 11 and 12 of sections 3 and 4 respectively. The surfaces 9, 10, 11 and 12 are all machined and hence surfaces 9 and 11 engage accurately, and likewise surfaces 10 and 12 engage accurately. In the completed caliper the pad recesses 5 and 8 which as viewed in FIG. 1 are of equivalent width, form a pad locating aperture generally designated by the reference numeral 13.

To the left-hand side of the pad locating aperture 13 as viewed in FIG. 1, the edge of the machined surface 11 contiguous to the pad locating aperture wall, is cut away at 14, thus exposing the part 15 of the machined surface 9. To the right-hand side of the caliper as viewed in FIG. 1, the machined surface 10 is cut away at 16 thus exposing the part 17 of the machined surface 12. These exposed parts 15 and 17 of the machined surfaces 9 and 12 respectively, act as datum surfaces for the pad anti-rattle spring illustrated in detail in FIGS. 4 to 7.

As evident from FIG. 1, the provision of cutaway portions 14 and 16 on the different halves of the caliper on diametrically opposed corners of each caliper half on the joint lines of surfaces 11 and 9, and surfaces 12 and 10, thus providing the possibility for each half of the caliper to be manufactured utilising the same jig and tool arrangement. This provides a considerable saving in the manufacture of the final caliper.

Alternatively, the cutaway portions could be made in the surfaces 11 and 12 of one caliper half or in surfaces 9 and 10 of the other caliper half as shown at 15', 15' in FIG. 8, or indeed one cutaway portion could be formed solely in one of the surfaces 9, 10, 11 and 12. Further by making the pad recess in one caliper half, larger in width i.e. when viewed in plan (FIG. 1) than the pad recess in the other complementary caliper half, exposed machined surfaces 15a, 15a are provided within the pad locating aperture as shown in FIG. 9. Also, when the caliper halves have pad recesses of equal width, by off-setting one caliper half relative to the other caliper half and bolting same together, parts 15b, 15c of the machined engaging surfaces of the caliper halves are exposed as is shown in FIG. 10. All these alternatives, provide the necessary machine surface on either or both sides of the pad locating aperture forming the necessary datum surface or surfaces for the pad anti-rattle spring.

Figure 4:
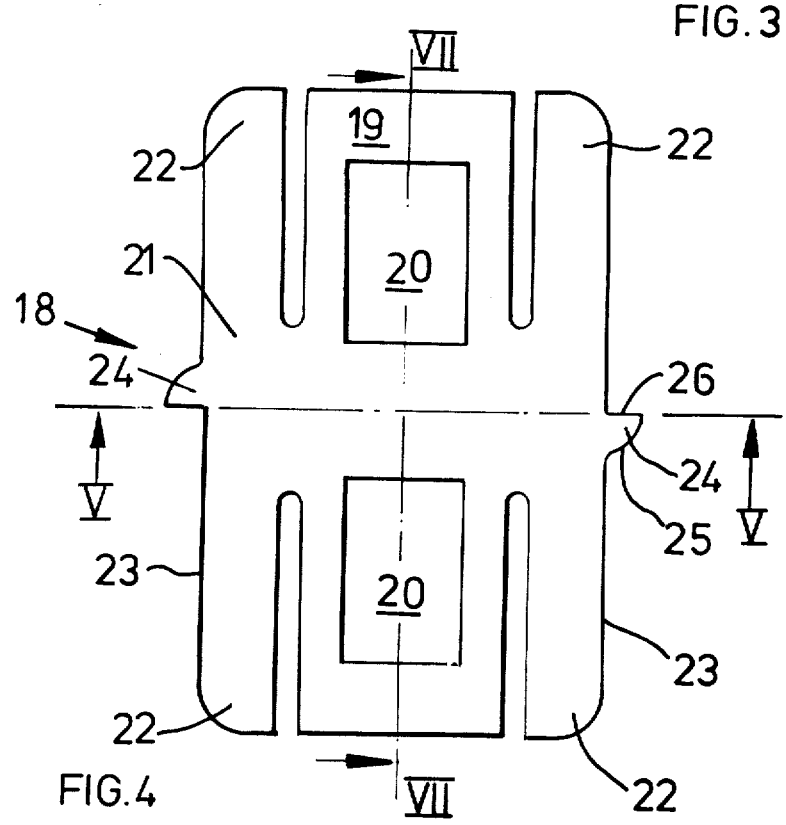
Figure 5:
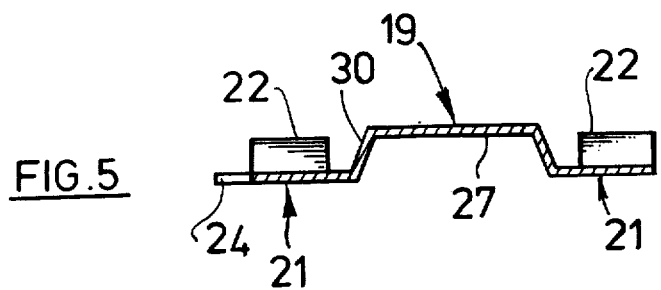
Figure 6:
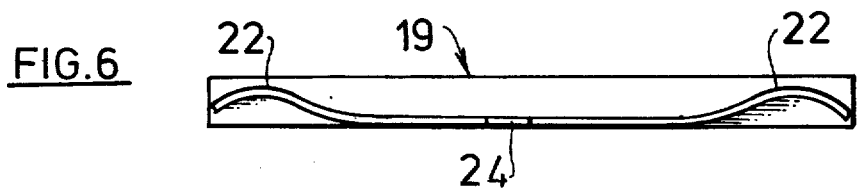
Figure 7:
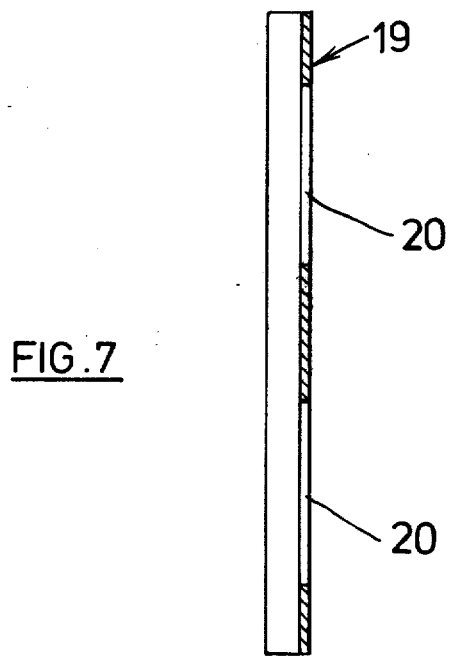

The pad anti-rattle spring 18 illustrated in position in the caliper in FIG. 1 is illustrated in detail in FIGS. 4 to 7. The spring has a generally rectangular central portion 19 which has located therein two window apertures 20. To each side of the central section 19 and integrally attached to the middle regions thereof, is an elongate spring member 21. As seen in FIG. 6, each spring member 21 for the major part of its length, lies in a plane substantially parallel to the plane in which said central section 19 lies, the end regions 22 of said spring member 21 being curved to provide the necessary resiliency for the spring. On the outside edge 23 of each elongate spring member 21, in the middle region thereof, is provided a tag 24, this tag being integrally connected to the elongate spring member 21 and lying in the same plane as said spring member. As seen in FIG. 4 each tag has a curved surface 25 and a straight edge 26. When the spring is arranged in the caliper as shown in FIG. 1, the tags 24 engage in the spaces provided by the cutaway regions 14 and 16 in the caliper halves. As seen from FIG. 5 the central section 19 lies in a separate plane parallel to the plane in which the main part of each elongate member 21, lies. When the spring is in position in the pad locating aperture of a caliper as illustrated in FIG. 1, the undersurface 27 of the central section 19 engages the top of the two pads located on guides within the pad locating aperture in the caliper. A pad retaining pin 28 (FIG. 1) passes through holes in the caliper halves and acts on the inclined portions 30 of the spring 18 to urge the elongated spring members 21 into engagement with part of the friction pad assembly.

In this position with the tags 24 engaging in the space provided by cutaway sections 14 and 16, the straight edges 26 of each tag engage against exposed machined surfaces 15 and 17. The window apertures 20 and the tags 24 are so arranged relative to each other to provide for a true reading to be obtainable of the degree of wear to the pads on inspection of the pads through said apertures 20, when the straight edges 26 of the tags 24 engage against the datum surfaces 15 and 17. It may be that the spring in an alternative embodiment may be movable in the pad locating aperture to some small extent, but merely by manually moving the spring so that the tag or tags engage the datum surface or surfaces, the required true reading may then be obtained.

Various configuration of the tags may be chosen, dependent upon the arrangement and formation of the datum surfaces on the halves of the caliper. For instance, whilst the tags 24 as illustrated in FIG. 4 are mirror images of each other, this being dictated by the arrangement of the cutaway regions in the caliper halves, it may be that the cutaway regions as previously described, are on one of the caliper halves alone, in which case identical tags would be provided on each elongate spring member 21.

The area exposed by the window apertures 20 is in relation to the total area of the hole spring, quite small, and hence the provision of the spring in the caliper provides a form of dust cover besides preventing the pads from rattling. Also, it will be evident to persons skilled in the art, the anti-rattle spring may be produced from a blank, the blank being stamped out and pressed to the required configuration.

I claim:

1. An opposed piston disc brake caliper of the fixed type comprising two caliper halves, a machined surface being provided on each caliper half, a pad recess being formed in each machined surface, the caliper halves being clamped together with their machined surfaces engaging each other, the pad recesses together forming a friction pad locating aperture, and part of at least one of said machined surfaces being exposed at least at one side of the friction pad locating aperture whereby the exposed part of the at least one machined surface provides a datum surface for accurate measurement relative thereto, and a spring of generally rectangular configuration, a window aperture in said spring, and a laterally projecting tag being arranged on at least one side of the spring to engage against said datum surface of the caliper to correctly locate the spring in the pad locating aperture enabling accurate inspection of brake pad wear.

2. An opposed piston disc brake caliper according to claim 1, wherein the machined surface of each caliper half is cutaway at one side of the pad recess, the cutaway portions on each caliper half being on opposite sides of the friction pad locating aperture.

3. An opposed piston disc brake caliper according to claim 1, wherein the machined surface of one caliper half is cutaway at both sides of the pad recess.

4. An opposed piston disc brake caliper according to claim 1, wherein the caliper halves have different width pad recesses so that when the caliper halves are clamped together the machined surface of the caliper half having the narrower pad recess, is exposed at either side of the pad locating aperture.

5. An opposed piston disc brake caliper according to claim 1, wherein the caliper halves are arranged to be clamped together slightly offset relative to each other, thus exposing part of the machined surface of each caliper half adjacent the pad locating aperture.

6. An opposed piston disc brake caliper according to claim 1 wherein said engaging machined surfaces lie in a plane parallel to the plane of rotation of a disc with which said caliper is adapted to be used, said tag having a locating surface parallel to the plane of said machined surfaces and arranged to engage against said datum surface defined by the exposed part of the at least one machined surface.

7. An opposed piston disc brake caliper according to claim 1 wherein there are two exposed machine surfaces, one each on the respective opposite sides of the pad aperture, said spring comprising a central rectangular section in which said window aperture is located, elongate spring members integrally attached in their middle regions one to the middle region of each of two opposed sides of said central sections, said first mentioned tag and a second tag being integral with and projecting laterally from the outer edges of each elongate spring member, said tags extending generally in opposite directions for locating engagement with the respective first and second exposed machine surfaces.

8. An opposed piston disc brake caliper according to claim 7, wherein each spring member for the major part of its length, lies in a plane substantially parallel to but spaced from the plane in which said central section lies, the end regions of said spring members being curved to provide the necessary resiliency for the spring.

* * * * *